(12) United States Patent
Tang

(10) Patent No.: US 11,218,900 B2
(45) Date of Patent: Jan. 4, 2022

(54) UPLINK TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 167 days.

(21) Appl. No.: 16/496,112

(22) PCT Filed: Mar. 22, 2017

(86) PCT No.: PCT/CN2017/077741
§ 371 (c)(1),
(2) Date: Sep. 20, 2019

(87) PCT Pub. No.: WO2018/170799
PCT Pub. Date: Sep. 27, 2018

(65) Prior Publication Data
US 2020/0100133 A1    Mar. 26, 2020

(51) Int. Cl.
*H04W 28/02* (2009.01)
*H04W 72/08* (2009.01)

(52) U.S. Cl.
CPC ... *H04W 28/0263* (2013.01); *H04W 28/0268* (2013.01); *H04W 72/085* (2013.01)

(58) Field of Classification Search
CPC ......... H04W 28/0263; H04W 28/0268; H04W 72/085; H04W 24/10; H04W 28/24;
(Continued)

(56) References Cited

U.S. PATENT DOCUMENTS 9,681,475 B2   6/2017 Hapsari et al.
2015/0003435 A1   1/2015 Horn et al.
(Continued)

FOREIGN PATENT DOCUMENTS

CN   102291763 A  * 12/2011
CN   102291763 A    12/2011
(Continued)

OTHER PUBLICATIONS

Ericsson: "QoS framework for NR", Generation Draft; R2-1700842—QoS for NR , 3rd Generation Partnership Project (3GPP), Mobile Competence Centre ; 650, Route Des Lucioles ; F-06921 Sophia-Antipolis Cedex ; France, vol. RAN WG2, No. Athens , Greece; Feb. 13, 2017-Feb. 17, 2017, Feb. 12, 2017 (Feb. 12, 2017), XP051211623 , Retrieved from the Internet: URL:http://www.3gpp.org/ftp/Meetings_3GPP_SYNC/RAN2/Docs/ [retrieved on Feb. 12, 2017]* Sections 2.2 Precedence order of reflective and.
(Continued)

*Primary Examiner* — Hardikkumar D Patel

(57) ABSTRACT

Provided in embodiments of the present application are an uplink transmission method, terminal device and network device. The terminal device can mark a quality of service (QoS) flow mapped by data carried in a data radio bearer (DRB). The method comprises: a terminal device determining, according to a first mapping relationship, a marking form of a first quality of service (QoS) flow corresponding to a data packet carried in a first data radio bearer (DRB), the first mapping relationship being a mapping relationship between the QoS flow and the DRB; according to the marking form of the first QoS flow, marking the first QoS flow corresponding to the data packet carried in the first DRB; and transmitting the marked data packet through the first DRB to a network device.

16 Claims, 3 Drawing Sheets

(58) Field of Classification Search
CPC . H04W 28/16; H04W 28/0273; H04W 80/08; H04W 76/27; H04W 28/08; H04L 1/00; H04L 28/24; H04L 5/0094; H04L 5/0044; H04L 47/2483; H04L 47/805; H04L 47/2491; H04L 47/2408; H04L 47/6215; H04L 47/24
See application file for complete search history.

(56) References Cited

U.S. PATENT DOCUMENTS

| | | | |
|---|---|---|---|
| 2016/0044722 | A1 | 2/2016 | Hapsari et al. |
| 2016/0338073 | A1 | 11/2016 | Nuggehalli et al. |
| 2016/0338102 | A1 | 11/2016 | Nuggehalli et al. |
| 2017/0251395 | A1 | 8/2017 | Hapsari et al. |
| 2018/0213540 | A1* | 7/2018 | Chiu .................. H04W 28/02 |

FOREIGN PATENT DOCUMENTS

| | | | | |
|---|---|---|---|---|
| CN | 105379351 | A | 3/2016 | |
| CN | 108390830 | A * | 8/2018 | ............ H04W 28/08 |
| EP | 2983433 | A1 | 2/2016 | |
| EP | 3017627 | A1 | 5/2016 | |
| EP | 3496479 | A1 | 6/2019 | |
| JP | 2015510377 | A | 4/2015 | |
| RU | 2608841 | C1 | 2/2017 | |
| WO | 2014075265 | A1 | 5/2014 | |
| WO | 2017002987 | A1 | 1/2017 | |

OTHER PUBLICATIONS

Intel Corporation: "Supporting Next Gen QoS in NR", 3GPP Draft, R2-169070-QoS-V5, 3rd Generation Partnersship Project (3GPP), Mobile Competence Centre, 650, Route Des Lucioles: F-06921 Sophia-Antipolis Cedex; France, vol. RAN WG2, No. Reno, USA, Nov. 14, 2016-Nov. 18, 2018, Nov. 18, 2017 (Nov. 18, 2016), XP051193505, Retrieved from the Internet: URL:http://www.3gpp/ftp/tsg_ran/WG2_RL2/TSGR2_96/Docs/ [retrieved on Nov. 18, 2016] * Sections "2.2.2 QoS making" and "2.3 Message flow". Figure in p. 6. *

Supplementary European Search Report in European application No. 179016068, dated Feb. 17, 2020.

International Search Report in the International application No. PCT/CN2017/077741, dated Nov. 14, 2017.

Written Opinion of the international Search Authority in the international application No. PCT/CN2017/077741, dated Nov. 14, 2017.

First Office Action of the Indian application No. 201917039666, dated Jan. 13, 2021.

First Office Action of the Singaporean application No. 11201908775V, dated Mar. 23, 2021.

CATT, NR QoS open issues [online], 3GPP TSG RAN WG2 #96 R2-167611, Dec. 2016, Internet<URL:http://www.3gpp.org/ftp/tsg_ran/WG2_RL2/TSGR2_96/Docs/R2-167611.zip>.

Intel Corporation, Supporting Next Gen QoS in NR [online], 3GPP TSG RAN WG2 #96 R2-168509, Dec. 5, 2016, Internet<URL:http://www.3gpp.org/ftp/tsg_ran/WG2_RL2/TSGR2_96/Docs/R2-168509.zip>.

First Office Action of the Japanese application No. 2019-552142, dated Mar. 5, 2021.

First Office Action of the Korean application No. 10-2019-7027808, dated Feb. 25, 2021.

First Office Action of the Russian application No. 2019133369, dated Jun. 2, 2020.

First Office Action of the Chinese application No. 201911303856.5, dated Nov. 3, 2020.

First Office Action of the Chilean application No. 201902650, dated Aug. 19, 2020.

First Office Action of the Canadian application No. 3057177, dated Nov. 9, 2020.

Nokia, Alcatel-Lucent Shanghai Bell, "QoS flow relocation", 3GPP TSG-RAN WG2 Meeting #97 R2-1700814 Athens, Greece, Feb. 13-17, 2017.

English Translation of the Written Opinion of the International Search Authority in the international application No. PCT/CN2017/077741, dated Nov. 14, 2017.

Second Office Action of the Japanese application No. 2019-552142, dated Jun. 25, 2021.

* cited by examiner

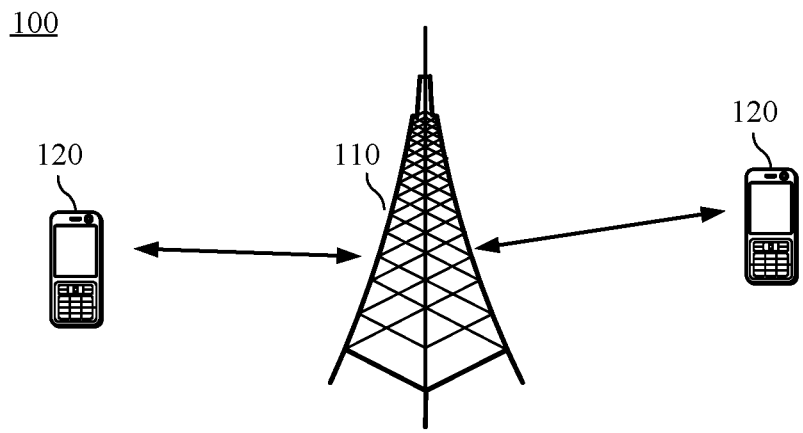

```
    ┌─────────────────────────────────────────────────────────────┐
    │  A terminal device determines, according to first mapping    │   S210
    │  relationships, an identification manner for a first QoS     │
    │  flow corresponding to a data packet carried in a first DRB, │
    │  here, the first mapping relationships are mapping           │
    │  relationships between QoS flows and DRBs                    │
    └─────────────────────────────────────────────────────────────┘
                                 │
                                 ▼
    ┌─────────────────────────────────────────────────────────────┐   S220
    │  The terminal device identifies, according to the            │
    │  identification manner for the first QoS flow, the first QoS │
    │  flow corresponding to the data packet carried in the first  │
    │  DRB                                                         │
    └─────────────────────────────────────────────────────────────┘
                                 │
                                 ▼
    ┌─────────────────────────────────────────────────────────────┐   S230
    │  The terminal device sends an identified data packet to a    │
    │  network device via the first DRB                            │
    └─────────────────────────────────────────────────────────────┘
```

FIG.2

UPLINK TRANSMISSION METHOD, TERMINAL DEVICE AND NETWORK DEVICE

TECHNICAL FIELD

The disclosure relates to the field of communications, and in particular to a method for uplink transmission, a terminal device and a network device.

BACKGROUND

In a New Radio (NR) system, a transmission parameter configuration for transmission of a data packet on an air interface is defined by a Data Radio Bearer (DRB). With the transmission parameter configuration, a Quality of Service (QoS) of a service carried in the DRB can be guaranteed, that is, which method is adopted for transmission to reach the QoS required by the DRB. For downlink transmission, an access network maps each of different QoS flows to a DRB according to a QoS flow Identity (ID); and for uplink transmission, how a terminal device identifies a QoS flow to which data carried in a DRB is mapped is a problem worthy of researching.

SUMMARY

The embodiments of the disclosure provide a method for uplink transmission, a terminal device and a network device, which can identify a QoS flow to which data carried in a DRB is mapped.

In a first aspect, there is provided a method for uplink transmission, which includes the following operations.

A terminal device determines, according to first mapping relationships, an identification manner for a first QoS flow corresponding to a data packet carried in a first DRB, here, the first mapping relationships are mapping relationships between QoS flows and DRBs.

The terminal device identifies, according to the identification manner for the first QoS flow, the first QoS flow corresponding to the data packet carried in the first DRB.

The terminal device sends an identified data packet to a network device via the first DRB.

In combination with the first aspect, in some implementation manner of the first aspect, in the first mapping relationships, the QoS flows are in one-to-one correspondences with the DRBs or the QoS flows are in multiple-to-one correspondences with the DRBs.

In combination with the first aspect, in some implementation manner of the first aspect, the method further includes the following operation.

The terminal device determines the first mapping relationships.

In combination with the first aspect, in some implementation manner of the first aspect, the operation that the terminal device determines the first mapping relationships includes the following operations.

The terminal device receives high layer signaling sent by the network device, here, the high layer signaling is used by the network device to configure the first mapping relationships to the terminal device.

The terminal device determines the first mapping relationships according to the high layer signaling.

In combination with the first aspect, in some implementation manner of the first aspect, the operation that the terminal device determines the first mapping relationships includes the following operations.

The terminal device receives high layer signaling sent by the network device, here, the high layer signaling indicates that the terminal device determines the first mapping relationships according to second mapping relationships, and the second mapping relationships are mapping relationships between DRBs and QoS flows for downlink data mapping.

The terminal device determines, as the first mapping relationships, the second mapping relationships on which a mirror mapping has been performed.

In combination with the first aspect, in some implementation manner of the first aspect, the operation that the terminal device determines, according to the first mapping relationships, the identification manner for the first QoS flow corresponding to the data packet carried in the first DRB includes the following operations.

When the QoS flows are in one-to-one correspondences with the DRBs in the first mapping relationships, the terminal device determines that a first identification manner is adopted to identify the first QoS flow, here, the first identification manner is that the first QoS flow corresponding to the data packet in the first DRB is identified by zero-bit identification information; or when the QoS flows are in multiple-to-one correspondences with the DRBs in the first mapping relationships, the terminal device determines the identification manner for the first QoS flow according to a number of QoS flows corresponding to one DRB.

In combination with the first aspect, in some implementation manner of the first aspect, the operation that the terminal device determines the identification manner for the first QoS flow according to the number of QoS flows corresponding to one DRB includes the following operations.

When the number of QoS flows corresponding to each DRB is identical in the first mapping relationships, the terminal device determines the identification manner for the first QoS flow according to the number of QoS flows corresponding to the first DRB; or when the numbers of QoS flows corresponding to at least two DRBs are different from each other in the first mapping relationships, the terminal device determines the identification manner for the first QoS flow according to the number of QoS flows corresponding to the first DRB; or when the numbers of QoS flows corresponding to at least two DRBs are different from each other in the first mapping relationships, the terminal device determines the identification manner for the first QoS flow according to the number of QoS flows corresponding to a second DRB, here, the second DRB is a DRB corresponding to a maximum number of QoS flows in the first mapping relationships.

In combination with the first aspect, in some implementation manner of the first aspect, the operation that the terminal device determines the identification manner for the first QoS flow according to the number of QoS flows corresponding to the first DRB includes the following operations.

When the number of QoS flows corresponding to the first DRB is less than a first preset number threshold, it is determined that a second identification manner is adopted to identify the first QoS flow, here, the second identification manner is that identification information having a specific number of bits is determined according to the number of QoS flows corresponding to the first DRB, and the first QoS flow is identified by the identification information having the specific number of bits; or when the number of QoS flows corresponding to the first DRB is greater than a first preset number threshold, it is determined that a third identification manner is adopted to identify the first QoS flow, here, the third identification manner is that the first QoS flow is identified by a QoS flow Identity (ID) of the first QoS flow.

In combination with the first aspect, in some implementation manner of the first aspect, the operation that the terminal device determines the identification manner for the first QoS flow according to the number of QoS flows corresponding to the second DRB includes the following operations.

When the number of QoS flows corresponding to the second DRB is less than a second preset number threshold, it is determined that a fourth identification manner is adopted to identify the first QoS flow, here, the fourth identification manner is that identification information having a specific number of bits is determined according to the number of QoS flows corresponding to the second DRB, and the first QoS flow is identified by the identification information having the specific number of bits; or when the number of QoS flows corresponding to the second DRB is greater than a second preset number threshold, it is determined that a fifth identification manner is adopted to identify the first QoS flow, here, the fifth identification manner is that the first QoS flow is identified by a QoS flow Identity (ID) of the first QoS flow.

In combination with the first aspect, in some implementation manner of the first aspect, the method further includes the following operation.

The terminal device receives third mapping relationships sent by the network device, here, the third mapping relationships include correspondences between the identification information having the specific number of bits and the QoS flows under a condition that the second identification manner or the fourth identification manner is adopted.

In combination with the first aspect, in some implementation manner of the first aspect, when at least two DRBs correspond to different numbers of QoS flows in the first mapping relationships, the method further includes the following operation.

The terminal device receives indication information from the network device, here, the indication information indicates that the terminal device determines the identification manner for the first QoS flow according to the number of QoS flows corresponding to the first DRB or the number of QoS flows corresponding to the second DRB.

In a second aspect, there is provided a method for uplink transmission, which includes the following operations.

A network device receives a data packet sent by a terminal device via a first DRB.

The network device determines, according to first mapping relationships, an identification manner for a first QoS flow corresponding to the data packet, here, the first mapping relationships are mapping relationships between QoS flows and DRBs.

The network device determines the first QoS flow corresponding to the data packet in the first DRB according to the identification manner for the first QoS flow.

The network device maps the data packet carried in the first DRB to the first QoS flow.

In combination with the second aspect, in some implementation manner of the second aspect, in the first mapping relationships, the QoS flows are in one-to-one correspondences with the DRBs or the QoS flows are in multiple-to-one correspondences with the DRBs.

In combination with the second aspect, in some implementation manner of the second aspect, the method further includes the following operation.

The network device determines the first mapping relationships.

In combination with the second aspect, in some implementation manner of the second aspect, the operation that the network device determines the first mapping relationships includes the following operation.

The network device determines, as the first mapping relationships, second mapping relationships on which a mirror mapping has been performed, here, the second mapping relationships are mapping relationships between DRBs and QoS flows for downlink data mapping.

In combination with the second aspect, in some implementation manner of the second aspect, the operation that the network device determines, according to the first mapping relationships, the identification manner for the first QoS flow corresponding to the data packet includes the following operations.

When the QoS flows are in one-to-one correspondences with the DRBs in the first mapping relationships, the network device determines that the terminal device identifies the first QoS flow by adopting a first identification manner, here, the first identification manner is that the first QoS flow corresponding to the data packet in the first DRB is identified by zero-bit identification information.

The operation that the network device determines the first QoS flow corresponding to the data packet in the first DRB according to the identification manner for the first QoS flow includes the following operation.

The network device determines, according to the first DRB and the first mapping relationships, a QoS flow corresponding to the first DRB as the first QoS flow.

In combination with the second aspect, in some implementation manner of the second aspect, the operation that the network device determines, according to first mapping relationships, the identification manner for the first QoS flow corresponding to the data packet includes the following operations.

When a number of QoS flows corresponding to each DRB is identical in the first mapping relationships, the network device determines the identification manner for the first QoS flow according to the number of QoS flows corresponding to the first DRB; or when numbers of QoS flows corresponding to at least two DRBs are different from each other in the first mapping relationships, the network device determines the identification manner for the first QoS flow according to the number of QoS flows corresponding to the first DRB; or when numbers of QoS flows corresponding to at least two DRBs are different from each other in the first mapping relationships, the network device determines the identification manner for the first QoS flow according to the number of QoS flows corresponding to a second DRB, here, the second DRB is a DRB corresponding to a maximum number of QoS flows in the first mapping relationships.

In combination with the second aspect, in some implementation manner of the second aspect, the operation that the network device determines the identification manner for the first QoS flow according to the number of QoS flows corresponding to the first DRB includes the following operations.

When the number of QoS flows corresponding to the first DRB is less than a first preset number threshold, it is determined that a second identification manner is adopted by the terminal device to identify the first QoS flow, here, the second identification manner is that identification information having a specific number of bits is determined according to the number of QoS flows corresponding to the first DRB, and the first QoS flow is identified by the identification information having the specific number of bits; or when the number of QoS flows corresponding to the first DRB is greater than the first preset number threshold, it is determined that a third identification manner is adopted to identify the first QoS flow, here, the third identification manner is that the first QoS flow is identified by a QoS flow Identity (ID) of the first QoS flow.

The operation that the network device determines the first QoS flow corresponding to the data packet in the first DRB according to the identification manner for the first QoS flow includes the following operation.

The network device determines the first QoS flow according to the identification information having the specific number of bits or the QoS flow ID of the first QoS flow.

In combination with the second aspect, in some implementation manner of the second aspect, the operation that the network device determines the identification manner for the first QoS flow according to the number of QoS flows corresponding to the second DRB includes the following operations.

When the number of QoS flows corresponding to the second DRB is less than a second preset number threshold, it is determined that a fourth identification manner is adopted to identify the first QoS flow, here, the fourth identification manner is that identification information having a specific number of bits is determined according to the number of QoS flows corresponding to the second DRB, and the first QoS flow is identified by the identification information having the specific number of bits; or when the number of QoS flows corresponding to the second DRB is greater than the second preset number threshold, it is determined that a fifth identification manner is adopted to identify the first QoS flow, here, the fifth identification manner is that the first QoS flow is identified by a QoS flow Identity (ID) of the first QoS flow.

The operation that the network device determines the first QoS flow corresponding to the data packet in the first DRB according to the identification manner for the first QoS flow includes the following operation.

The network device determines the first QoS flow according to the identification information having the specific number of bits or the QoS flow ID of the first QoS flow.

In combination with the second aspect, in some implementation manner of the second aspect, the network device sends third mapping relationships to the terminal device, here, the third mapping relationships include correspondences between the identification information having the specific number of bits and the QoS flows under a condition that the second identification manner or the fourth identification manner is adopted.

In combination with the second aspect, in some implementation manner of the second aspect, when at least two DRBs correspond to different numbers of QoS flows in the first mapping relationships, the method further includes the following operation.

The network device sends indication information to the terminal device, here, the indication information indicates that the terminal device determines the identification manner for the first QoS flow according to the number of QoS flows corresponding to the first DRB or the number of QoS flows corresponding to the second DRB.

In a third aspect, there is provided a terminal device, which includes a unit configured to execute the method in the first aspect or various implementation manners thereof.

In a fourth aspect, there is provided a network device, which includes a unit configured to execute the method in the second aspect or various implementation manners thereof.

In a fifth aspect, there is provided a terminal device, which includes a memory, a processor and a transceiver. The memory is configured to store a program. The processor is configured to execute the program; and when the program is executed, the processor executes the method in the first aspect based on the transceiver.

In a sixth aspect, there is provided a network device, which includes a memory, a processor and a transceiver. The memory is configured to store a program. The processor is configured to execute the program; and when the program is executed, the processor executes the method in the second aspect based on the transceiver.

In a seventh aspect, there is provided a computer readable medium, The computer readable medium stores a program code executed by a terminal device, and the program code includes an instruction for executing the method in the first aspect.

In an eighth aspect, there is provided a computer readable medium. The computer readable medium stores a program code executed by a terminal device, and the program code includes an instruction for executing the method in the second aspect.

BRIEF DESCRIPTION OF DRAWINGS

FIG. 1 is a diagram of a wireless communication system according to an embodiment of the disclosure.

FIG. 2 is a flowchart of a method for uplink transmission according to an embodiment of the disclosure.

DETAILED DESCRIPTION

Figure 3:
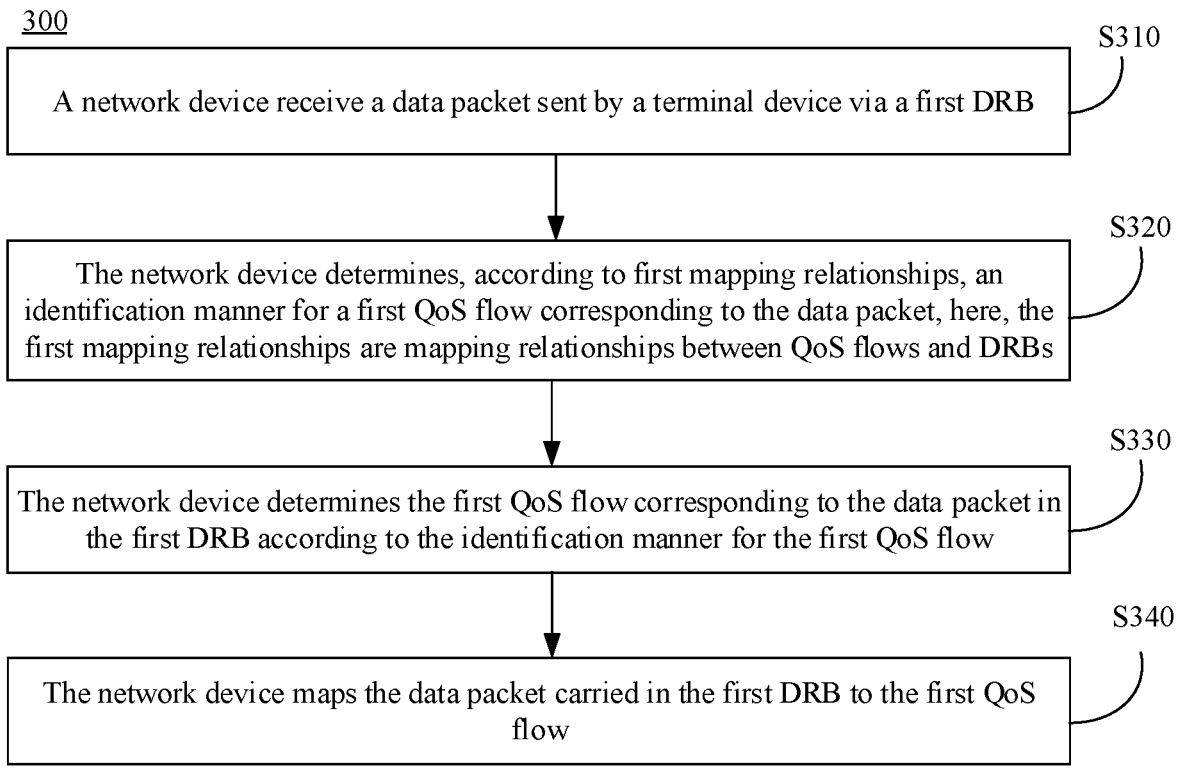
FIG. 3 is a flowchart of a method for uplink transmission according to another embodiment of the disclosure.

The technical solutions in the embodiments of the disclosure will be described below in combination with the accompanying drawings.

It is to be understood that terms "system" and "network" in the disclosure may usually be exchanged in the disclosure. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a General Packet Radio Service (abbreviated as "GPRS"), a Long Term Evolution (abbreviated as "LTE") system, an LTE Frequency Division Duplex (abbreviated as "FDD") system, an LTE Time Division Duplex (abbreviated as "TDD") system, a Universal Mobile Telecommunication System (abbreviated as "UMTS") system, a Worldwide Interoperability for Microwave Access (abbreviated as "WiMAX") communication system or future 5G system, etc.

FIG. 1 illustrates a wireless communication system 100 to which the embodiments of the disclosure is applied. The wireless communication system 100 may include a network device 110. The network device 110 may be a device communicated with a terminal device. The network device 110 may provide communication coverage for a specific geographical area, and may communicate with a terminal device (such as UE) located within the coverage area. Optionally, the network device 110 may be a Base Transceiver Station (BTS) in a GSM system or a CDMA system, may also be an Node B (NB) in a WCDMA system, and may further be an Evolutional Node B (eNB or eNodeB) in an LTE system, or a wireless controller in a Cloud Radio Access Network (CRAN). Or the network device may be a relay station, an access point, a vehicle-amounted device, a wearable device as well as a network side device in the future 5G system or a network side device in the future evolved Public Land Mobile Network (PLMN) network, etc.

The wireless communication system 100 may further include at least one terminal device 120 located within a coverage range of the network device 110. The terminal device 120 may be movable or fixed. Optionally, each terminal device 120 may be an access terminal, User Equipment (UE), a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, vehicle-amounted devices, wearable devices, a terminal device in a future 5G network or a terminal device in a future evolved Public Land Mobile Network (PLMN) network, etc.

Optionally, Device to Device (D2D) communication may be performed between the terminal devices 120.

Optionally, the 5G system or network may further be referred to as an NR system or network.

FIG. 1 exemplarily illustrates a network device and two terminal devices. Optionally, the wireless communication system 100 may include multiple network devices, and there is other number of terminal devices in a coverage range of each network device, which is not limited by the embodiment of the disclosure thereto.

In the related art, in downlink transmission, the network device maps different QoS flows to different DRBs for transmission. In uplink transmission, in order that the network device knows which QoS flow to which a data packet transmitted in a DRB is mapped, the terminal device carries a QoS flow ID in the data packet, and thus the air interface overhead is large. Therefore, the embodiments of the disclosure provide a method for uplink transmission. A terminal device can identify, according to first mapping relationships for uplink data mapping, a QoS flow corresponding to a data packet carried in a DRB and thus the air interface overhead can be reduced.

FIG. 2 is a flowchart of a method for uplink transmission 200 according to an embodiment of the disclosure. The method 200 may be executed by a terminal device in the wireless communication system in FIG. 1. As illustrated in FIG. 2, the method 200 includes the following operations.

At S210, a terminal device determines, according to first mapping relationships, an identification manner for a first QoS flow corresponding to a data packet carried in a first DRB, here, the first mapping relationships are mapping relationships between QoS flows and DRBs.

Specifically, in the first mapping relationships, the QoS flows are in one-to-one correspondences with the DRBs, or the QoS flows are in multiple-to-one correspondences with the DRBs, i.e., the first mapping relationships may be one-to-one or multiple-to-one mapping relationships. The terminal device sends the data packet to the network device via the first DRB. The data packet corresponds to the first QoS flow. The terminal device needs to notify the network device of mapping the data packet carried in the first DRB to the first QoS flow. The terminal device may determine the identification manner for the first QoS flow according to the first mapping relationships, and notify, in a specific identification manner, the network device of a QoS flow to which the data packet carried in the first DRB needs to be mapped.

Optionally, the operation that a terminal device determines, according to first mapping relationships, the identification manner for the first QoS flow corresponding to the data packet carried in the first DRB includes the following operations.

If the QoS flows are in one-to-one correspondences with the DRBs in the first mapping relationships, the terminal device determines that a first identification manner is adopted to identify the first QoS flow, here, the first identification manner is that the first QoS flow corresponding to the data packet in the first DRB is identified by adopting zero-bit identification information; or if the QoS flows are in multiple-to-one correspondences with the DRBs in the first mapping relationships, the terminal device determines the identification manner for the first QoS flow according to the number of QoS flows corresponding to one DRB.

Specifically, in a case where the first mapping relationships are one-to-one mapping relationships and one QoS flow corresponds to one DRB, the terminal device does not need to include identification information of the QoS flow in the data packet, i.e., there is no the identification information of the QoS flow in the data packet. The network device may determine, according to a DRB used by the received data packet and in combination with the first mapping relationships, the QoS flow corresponding to the data packet and thus may map the data packet to the corresponding QoS flow. In this case, the terminal device does not need to include the identification information of the QoS flow in the data packet, so that the air interface overhead can be reduced. Specifically, the network device may acquire, upon the reception of the data packet, the identification information of the QoS flow in the data packet. If it is determined that there is no the identification information of the QoS flow in the data packet, the network device may determine that the terminal device identifies the first QoS flow by using the first identification manner, and thus the network device may determine that the data packet is carried via the first DRB, then may determine the QoS flow corresponding to the first DRB in combination with the first mapping relationships and thus may map the data packet to the QoS flow corresponding to the first DRB.

Optionally, if the QoS flows are in multiple-to-one correspondences with the DRBs in the first mapping relationships, the terminal device may determine the identification manner for the first QoS flow according to the number of QoS flows corresponding to one DRB. For example, the terminal device may determine the identification manner for the first QoS flow according to the number of QoS flows corresponding to the first DRB, or may also determine the identification manner for the first QoS flow according to the number of QoS flows corresponding to a second DRB, here, the second DRB is a DRB corresponding to the maximum number of QoS lows in the first mapping relationships.

Optionally, in some embodiments, the operation that the terminal device determines the identification manner for the first QoS flow according to the number of QoS flows corresponding to one DRB includes the following operations.

If the number of QoS flows corresponding to each DRB is the identical in the first mapping relationships, the terminal device determines the identification manner for the first QoS flow according to the number of QoS flows corresponding to the first DRB; or if the numbers of QoS flows corresponding to at least two DRBs are different from each other in the first mapping relationships, the terminal device determines the identification manner for the first QoS flow according to the number of QoS flows corresponding to the first DRB; or if the numbers of QoS flows corresponding to at least two DRBs are different from each other in the first mapping relationships, the terminal device determines the identification manner for the first QoS flow according to the number of QoS flows corresponding to a second DRB, here, the second DRB is a DRB corresponding to the maximum number of QoS flows in the first mapping relationships.

Specifically, if the number of QoS flows corresponding to each DRB is the identical in the first mapping relationships, the terminal device may determine the identification manner for the first QoS flow according to the number of QoS flows corresponding to the first DRB. Optionally, if the numbers of QoS flows corresponding to at least two DRBs are different from each other in the first mapping relationships, the terminal device may determine the identification manner for the first QoS flow according to the number of QoS flows corresponding to the first DRB, or the terminal device may also determine the identification manner for the first QoS flow according to the number of QoS flows corresponding to the second DRB, here, the second DRB is a DRB corresponding to the maximum number of QoS lows in the first mapping relationships. That is, if the numbers of QoS flows corresponding to at least two DRBs are different from each other in the first mapping relationships, the terminal device may determine an identification manner for a QoS flow corresponding to each DRB according to the number of QoS flows corresponding to the DRB, or may also determine an identification manner for a QoS flow corresponding to each DRB according to the number of QoS flows corresponding to the second DRB in the first mapping relationships.

For example, if each DRB corresponds to two QoS flows in the first mapping relationships, i.e., the first mapping relationships are two-to-one mapping relationships, the terminal device may determine that 1-bit identification information is adopted to identify the first QoS flow. For example, the first DRB corresponds to a QoS flow 1 and a QoS flow 2, the 1-bit identification information corresponding to the first DRB is set as 0 to indicate the QoS flow 1 and is set as 1 to indicate the QoS flow 2. The network device acquire, upon the reception of the data packet, identification information in the data packet and determines that the first DRB is used to send the data packet; and then determines, based on correspondences between the 1-bit identification information and the QoS flows under the condition of the first DRB, that the data packet in the first DRB is mapped to the QoS flow 2 when the identification information in the data packet is 1. Or if each DRB in the first mapping relationships corresponds to three QoS flows, i.e., the first mapping relationships are three-to-one mapping relationships, the terminal device may determine that the 2-bit identification information is adopted to identify the first QoS flow. For example, the first DRB corresponds to a QoS flow 1, a QoS flow 2 and a QoS flow 3, correspondences between the 2-bit identification information and the QoS flows may be set as follows: 00 indicates the QoS flow 1, 01 indicates the QoS flow 2, and 10 and 11 indicate the QoS flow 3.

Also for example, in the first mapping relationships, the first DRB corresponds to two QoS flows and the second DRB corresponds to four QoS flows. The terminal device may determine the identification manner for the first QoS flow according to the number of QoS flows corresponding to the first DRB, e.g., the 1-bit identification information may be adopted to identify the first QoS flow; or may also determine the identification manner for the first QoS flow according to the number of QoS flows corresponding to the second DRB, e.g., the 2-bit identification information may be adopted to identify the first QoS flow. That is, if the numbers of QoS flows corresponding to at least two DRBs are different from each other in the first mapping relationships, the terminal device may determine an identification manner for a QoS flow corresponding to each DRB according to the number of QoS flows corresponding to the DRB, or may also determine an identification manner for a QoS flow corresponding to each DRB according to the number of QoS flows corresponding to the second DRB in the first mapping relationships.

Optionally, in some embodiments, the operation that the terminal device determines the identification manner for the first QoS flow according to the number of QoS flows corresponding to the first DRB includes the following operations.

If the number of QoS flows corresponding to the first DRB is less than a first preset number threshold, it is determined that a second identification manner is adopted to identify the first QoS flow, here, the second identification manner is that identification information having a specific number of bits is determined according to the number of QoS flows corresponding to the first DRB, and the first QoS flow is identified by the identification information having the specific number of bits; or if the number of QoS flows corresponding to the first DRB is greater than the first preset number threshold, it is determined that a third identification manner is adopted to identify the first QoS flow, here, the third identification manner is that the first QoS flow is identified by adopting a QoS flow ID of the first QoS flow.

Specifically, if the first DRB corresponds to multiple QoS flows and the first QoS flow is one of the multiple QoS flows, the terminal device may determine an identification manner for the first QoS flow according to a relationship between the number of the multiple QoS flows corresponding to the first DRB and a first preset number threshold. For example, when the number of the multiple QoS flows is less than the first preset number threshold, the terminal device may determine that the second identification manner is adopted to identify the first QoS flow, i.e., identification information having a specific number of bits is adopted to identify the first QoS flow. The number of bits of the identification information may be determined according to the number of QoS flows corresponding to the first DRB, i.e., may be determined according to the number of the multiple QoS flows. For example, if the first DRB corresponds to two QoS flows, it may be determined that 1-bit identification information is adopted; or if the first DRB corresponds to three QoS flows, it may be determined that 2-bit identification information is adopted; or if the first DRB corresponds to five QoS flows, it may be determined that 3-bit identification information is adopted; or the DRB corresponds to seven QoS flows, it may be determined that the 3-bit identification information is adopted. Optionally, if the number of QoS flows corresponding to the first DRB is greater than the first preset number threshold, it is determined that the third identification manner is adopted to identify the first QoS flow, i.e., the terminal device directly adopts a QoS flow ID of the first QoS flow to identify the first QoS flow. For example, the first preset number threshold may be 8, and when the number of QoS flows corresponding to a DRB is greater than 8, identification information having at least 4 bits is adopted to identify the QoS flow. Compared with that the ID of the QoS flow is directly adopted to identify the QoS flow, the identification information having at least 4 bits is adopted to identify the QoS flows, which is little effect in reducing the air interface overhead. Therefore, the ID of the QoS flow may be directly adopted to identify the first QoS flow.

Correspondingly, the network device may receive a data packet sent by the terminal device via the first DRB. The network device may also determine, according to the foregoing method, that what identification manner is adopted to identify a QoS flow corresponding to the data packet, and then the network device may determine the first QoS flow corresponding to the data carried in the first DRB according to the identification manner for the first QoS flow. For example, if the network device determines that the terminal device identifies the first QoS flow by using the first identification manner, the network device may determine, upon the reception of the data packet, that the data packet is carried via the first DRB, then may determine the QoS flow corresponding to the first DRB in combination with the first mapping relationships and thus may map the data packet carried in the first DRB to the QoS flow corresponding to the first DRB. Also for example, if the network device determines that the terminal device identifies the first QoS flow by using the second identification manner, the network device may acquire, upon the reception of the data packet, identification information having a specific number of bits in the data packet, and determines a QoS flow corresponding to the data packet according to the identification information having the specific number of bits. Specifically, the network device may determine, according to a DRB used for the terminal device to send the data packet and in combination with the correspondences between the identification information having the specific number of bits and the QoS flows, which QoS flow to which the data packet needs to be mapped. Optionally, in the second identification manner, the correspondences between the identification information having the specific number of bits and the QoS flows may be configured to the terminal device by the network device, so that the terminal device may fill the identification information having the specific number of bits according to the correspondences, and the network device may parse a QoS flow corresponding to the identification information having the specific number of bits according to the correspondences.

Optionally, in some embodiments, the operation that the terminal device determines the identification manner for the first QoS flow according to the number of QoS flows corresponding to the second DRB includes the following operations.

If the number of QoS flows corresponding to the second DRB is less than a second preset number threshold, it is determined that a fourth identification manner is adopted to identify the first QoS flow, here, the fourth identification manner is that identification information having a specific number of bits is determined according to the number of QoS flows corresponding to the second DRB, and the first QoS flow is identified according to the identification information having the specific number of bits; or if the number of QoS flows corresponding to the second DRB is greater than the second preset number threshold, it is determined that a fifth identification manner is adopted to identify the first QoS flow, here, the fifth identification manner is that the first QoS flow is identified by a QoS flow ID of the first QoS flow.

Specifically, the terminal device determines the identification manner for the first QoS flow according to the number of QoS flows corresponding to the second DRB may refer to relevant description on that the terminal device determines the identification manner for the first QoS flow according to the number of QoS flows corresponding to the first DRB, and details will not be repeated for the briefness.

Optionally, in some embodiments, the method further includes the following operation.

The terminal device receives third mapping relationships sent by the network device, here, the third mapping relationships include correspondences between the identification information having the specific number of bits and the QoS flows under a condition that the second identification manner or the fourth identification manner is adopted.

That is, if the terminal device identifies the first QoS flow by adopting the second identification manner or the fourth identification manner, the terminal device identifies the first QoS flow by the identification information having the specific number of bits. In this case, the correspondences between the identification information having the specific number of bits and the QoS flows may be configured to the terminal device by the network device, i.e., which QoS flow corresponds to specific contents of the identification information having the specific number of bits, which may be configured to the terminal device by the network device. Likewise, the network device may also parse the identification information having the specific number of bits included in the data packet according to the correspondences. For example, if the terminal device identifies the first QoS flow by adopting the 2-bit identification information, the correspondences which is pre-configured to the terminal device by the network device may be as follows: 00 indicates the QoS flow 1, 01 indicates the QoS flow 2 and 10 indicates the QoS flow 3, so that the network device acquires, upon the reception of the data packet, the 2-bit identification information in the data packet. If the 2-bit identification information is 10, the network device may determine that the data packet is mapped to the QoS flow 3.

If the number of QoS flows corresponding to each DRB is the identical in the first mapping relationships, then for each DRB, the correspondences between the identification information having the specific number of bits and the QoS flows may be the identical and may also be different. For example, each DRB corresponds to two QoS flows, the correspondences between the identification information having the specific number of bits (e.g., 1-bit identification information) for identifying the QoS flows corresponding to each DRB and the QoS flows may be the identical, e.g., 0 indicates the QoS flow 1 and 1 indicates the QoS flow 2; or may also be different, e.g., for the DRB 1, 0 indicates the QoS flow 1 and 1 indicates the QoS flow 2, and for the DRB 2, 0 indicates the QoS flow 3 and 1 indicates the QoS flow 4. If the numbers of QoS flows corresponding to at least two DRBs are different from each other in the first mapping relationships, the third mapping relationships may include correspondences between identification information having a specific number of bits and QoS flows, for each DRB. That is, the third mapping relationships may include correspondences between identification information having a specific number of bits for describing QoS flows corresponding to each DRB and the QoS flows corresponding to each DRB. For example, the first mapping relationships includes a DRB1, a DRB2 and a DRB3, the DRB1 corresponds to a QoS flow 1 and a QoS flow 2, the DRB2 corresponds to a QoS flow 3, and the DRB3 corresponds to a QoS flow 4, a QoS flow 5 and a QoS flow 6. The terminal device may identify the QoS flows corresponding to each DRB by adopting the second identification manner, or may also identify the QoS flows corresponding to each DRB by adopting the fourth identification manner. If the terminal device identifies the QoS flows corresponding to each DRB by adopting the second identification manner, the QoS flow 1 and the QoS flow 2 corresponding to the DRB1 may be identified by the 1-bit identification information, the QoS flow 3 corresponding to the DRB2 may be identified by using the 1-bit identification information, and the QoS flow 4, the QoS flow 5 and the QoS flow 6 corresponding to the DRB3 may be identified by the 2-bit identification information, and the third mapping relationships may include the contents illustrated in Table 1.

TABLE 1

| DRB ID | Correspondences between identification information having the specific number of bits and QoS flows |
|---|---|
| DRB1 | 0: QoS flow 1, 1: QoS flow 2 |
| DRB2 | 0: QoS flow 3, 1: reserved |
| DRB3 | 00: QoS flow 4, 01: QoS flow 5, 10: QoS flow 6, 11: reserved |

Optionally, if the fourth identification manner is adopted to identify the QoS flows corresponding to each DRB, among three DRBs, a DRB corresponding to the maximum number of QoS flows is the DRB3, it is determined according to the number of QoS flows corresponding to the DRB3 that the 2-bit identification information is adopted to identify each QoS flow, and the third mapping relationships may be illustrated in Table 2.

TABLE 2

| DRB ID | Correspondences between identification information having the specific number of bits and QoS flows |
|---|---|
| DRB1 | 00: QoS flow 1, 01: QoS flow 2, 10 and 11: reserved |
| DRB2 | 00-11: QoS flow 3 |
| DRB3 | 00: QoS flow 4, 01: QoS flow 5, 10: QoS flow 6, 11: reserved |

Optionally, in some embodiments, if at least two DRBs correspond to different numbers of QoS flows in the first mapping relationships, the method further includes the following operation.

The terminal device receives indication information from the network device, here, the indication information indicates that the terminal device determines the identification manner for the first QoS flow according to the number of QoS flows corresponding to the first DRB or the number of QoS flows corresponding to the second DRB.

That is, the network may configure that whether the second identification manner or the fourth identification manner is adopted by the terminal device to identify the first QoS flow.

At S220, the terminal device identifies, according to the identification manner for the first QoS flow, the first QoS flow corresponding to the data packet carried in the first DRB.

At S230, the terminal device sends an identified data packet carried in the first DRB to a network device.

Specifically, if the terminal device determines that the first QoS flow is identified by using the first identification manner, the data packet carried in the first DRB includes zero-bit identification information, i.e., the data packet does not include identification information of the first QoS flow. In this way, the network device determines, upon the reception of the data packet, that the data packet does not include the identification information of the first QoS flow, and the network device determines, according to a DRB used by the terminal device to send the data packet and in combination with the first mapping relationships, which QoS flow to which the data packet needs to be mapped. For the network device, if the network device configures the first mapping relationships to the terminal device, the network device knows the mapping first relationships; and if the network device informs the terminal device of determining the first mapping relationships according to second mapping relationships, the network device may also determine the first mapping relationships according to the second mapping relationships.

If the terminal device determines that the second identification manner or fourth identification manner is adopted to identify the first QoS flow, the terminal device includes, in the data packet, identification information having a special number of bits, identifies the first QoS flow by the identification information, and then sends the data packet to the network device via the first DRB. The network device may acquire, upon the reception of the data packet, the identification information having the specific number of bits, and determines a QoS flow corresponding to the data packet according to the identification information having the specific number of bits. Optionally, the correspondences between the identification information having the specific number of bits and the QoS flows may be configured to the terminal device by the network device, so that the terminal device may fill the identification information having the specific number of bits according to the correspondences, and the network device may analyze, according to the correspondences, which QoS flow is indicated by the identification information having the specific number of bits.

Optionally, in some embodiments, the method further includes the following operation.

The terminal device determines the first mapping relationships.

Optionally, in some embodiments, the operation that the terminal device determines the first mapping relationships includes the following operations.

The terminal device receives high layer signaling sent by the network device, here, the high layer signaling is used by the network device to configure the first mapping relationships to the terminal device.

The terminal device determines the first mapping relationships according to the high layer signaling.

That is, the network device may configure the first mapping relationships to the terminal device directly via the high layer signaling. Since the first mapping relationships are configured to the terminal device by the network device, the network device also knows the first mapping relationships.

Optionally, in some embodiments, the operation that the terminal device determines the first mapping relationships includes the following operations.

The terminal device receives high layer signaling sent by the network device, here, the high layer signaling indicates that the terminal device determines the first mapping relationships according to second mapping relationships, and the second mapping relationships are mapping relationships between DRBs and QoS flows for downlink data mapping.

The terminal device determines, as the first mapping relationships, the second mapping relationship on which a mirror mapping has been performed.

In such a case, the network device may notify the terminal device that how to determine the first mapping relationships, e.g., the terminal device may determine the first mapping relationships according to the second mapping relationships. The second mapping relationships are the mapping relationships between the DRBs and the QoS flows for the downlink data mapping. The terminal device may perform a mirror mapping on the second mapping relationships to obtain the first mapping relationships. In such a case, the network device also knows the second mapping relationships, so the network device may determine the first mapping relationships by adopting the same manner as the manner adopted by the terminal device.

That is, the first mapping relationships may be configured to the terminal device by the network device via the high layer signaling, or may also be determined by the terminal device according to the second mapping relationships, here, the second mapping relationships are mapping relationships for downlink data transmission, and the second mapping relationships are mapping relationships between DRBs and QoS flows. Optionally, the network device may configure the second mapping relationships to the terminal device via the high layer signaling; and then, the network device may notify the terminal device via the high layer signaling (e.g., Radio Resource Control (RRC) signaling) of determining the first mapping relationships according to the second mapping relationships, i.e., the second mapping relationship on which the mirror mapping has been performed is determined as the first mapping relationships.

Generally, the network device may know the first mapping relationships, so the network device may also determine an identification manner for a QoS flow corresponding to the received data packet based on the first mapping relationships according to the method described in S210. Specifically, the network device may determine, according to a DRB through which the data packet is sent and in combination with the first mapping relationships, the number of QoS flows corresponding to the DRB, and thus may determine which identification manner is adopted by the terminal device to identify the QoS flow corresponding to the data packet. Thereafter, the network device may determine, according to the foregoing method, which QoS flow to which the data packet needs to be mapped.

The method for uplink transmission according to the embodiments of the disclosure is described above in detail in combination with FIG. 2 and from the perspective of the terminal device. Hereinafter, a method for uplink transmission according to the embodiments of the disclosure will be described in detail in combination with FIG. 3 and from the perspective of the network device. It should be understood that the description on the network device corresponds to the description on the terminal device. The similar description may refer to the above embodiments and will not be repeated herein to avoid the repetition.

FIG. 3 is a flowchart of a method for uplink transmission according to another embodiment of the disclosure. As illustrated in FIG. 3, the method 300 includes the following operations.

At S310, a network device receives a data packet sent by a terminal device via a first DRB.

At S320, the network device determines, according to first mapping relationships, an identification manner for a first QoS flow corresponding to the data packet, here, the first mapping relationships are mapping relationships between QoS flows and DRBs.

At S330, the network device determines the first QoS flow corresponding to the data packet in the first DRB according to the identification manner for the first QoS flow.

At S340, the network device maps the data packet carried in the first DRB to the first QoS flow.

Optionally, in some embodiments, in the first mapping relationships, the QoS flows are in one-to-one correspondences with the DRBs or the QoS flows are in multiple-to-one correspondences with the DRBs.

Optionally, in some embodiments, the method further includes the following operation.

The network device determines the first mapping relationships.

Optionally, in some embodiments, the operation that the network device determines the first mapping relationships includes the following operations.

The network device determines, as the first mapping relationships, second mapping relationships on which a mirror mapping has been performed, here, the second mapping relationships are mapping relationships between DRBs and QoS flows for downlink data mapping.

Optionally, in some embodiments, the operation that the network device determines, according to first mapping relationships, the identification manner for the first QoS flow corresponding to the data packet includes the following operations.

If the QoS flows are in one-to-one correspondences with the DRBs in the first mapping relationships, the network device determines that the terminal device identifies the first QoS flow by adopting a first identification manner, here, the first identification manner is that the first QoS flow corresponding to the data packet in the first DRB is identified by zero-bit identification information.

The operation that the network device determines the first QoS flow corresponding to the data packet in the first DRB according to the identification manner for the first QoS flow includes the following operation.

The network device determines, according to the first DRB and the first mapping relationships, a QoS flow corresponding to the first DRB as the first QoS flow.

Optionally, in some embodiments, the operation that the network device determines, according to first mapping relationships, the identification manner for the first QoS flow corresponding to the data packet includes the following operations.

If the number of QoS flows corresponding to each DRB is identical in the first mapping relationships, the network device determines the identification manner for the first QoS flow according to the number of QoS flows corresponding to the first DRB; or if the numbers of QoS flows corresponding to at least two DRBs are different from each other in the first mapping relationships, the network device determines the identification manner for the first QoS flow according to the number of QoS flows corresponding to the first DRB; or if the numbers of QoS flows corresponding to at least two DRBs are different from each other in the first mapping relationships, the network device determines the identification manner for the first QoS flow according to the number of QoS flows corresponding to a second DRB, here, the second DRB is a DRB corresponding to the maximum number of QoS flows, in the first mapping relationships.

Optionally, in some embodiments, the operation that the network device determines the identification manner for the first QoS flow according to the number of QoS flows corresponding to the first DRB includes the following operations.

If the number of QoS flows corresponding to the first DRB is less than a first preset number threshold, it is determined that a second identification manner is adopted by the terminal device to identify the first QoS flow, here, the second identification manner is that identification information having a specific number of bits is determined according to the number of QoS flows corresponding to the first DRB, and the first QoS flow is identified by the identification information having the specific number of bits; or if the number of QoS flows corresponding to the first DRB is greater than the first preset number threshold, it is determined that a third identification manner is adopted to identify the first QoS flow, here, the third identification manner is that the first QoS flow is identified by a QoS flow ID of the first QoS flow.

The operation that the network device determines the first QoS flow corresponding to the data packet in the first DRB according to the identification manner for the first QoS flow includes the following operation.

The network device determines the first QoS flow according to the identification information having the specific number of bits or the QoS flow ID of the first QoS flow.

Optionally, in some embodiments, the operation that the network device determines the identification manner for the first QoS flow according to the number of QoS flows corresponding to the second DRB includes the following operations.

If the number of QoS flows corresponding to the second DRB is less than a second preset number threshold, it is determined that a fourth identification manner is adopted to identify the first QoS flow, here, the fourth identification manner is that identification information having a specific number of bits is determined according to the number of QoS flows corresponding to the second DRB, and the first QoS flow is identified according to the identification information having the specific number of bits; or if the number of QoS flows corresponding to the second DRB is greater than the second preset number threshold, it is determined that a fifth identification manner is adopted to identify the first QoS flow, here, the fifth identification manner is that the first QoS flow is identified by a QoS flow ID of the first QoS flow.

The operation that the network device determines the first QoS flow corresponding to the data packet in the first DRB according to the identification manner for the first QoS flow includes the following operation.

The network device determines the first QoS flow according to the identification information having the specific number of bits or the QoS flow ID of the first QoS flow.

Optionally, in some embodiments, the method further includes the following operation.

The network device sends third mapping relationships to the network device, here, the third mapping relationships include correspondences between the identification information having the specific number of bits and the QoS flows under a condition that the second identification manner or the fourth identification manner is adopted.

Optionally, in some embodiments, if at least two DRBs correspond to different numbers of QoS flows in the first mapping relationships, the method further includes the following operation.

The network device sends indication information to the terminal device, here, the indication information indicates that the terminal device determines the identification manner for the first QoS flow according to the number of QoS flows corresponding to the first DRB or the number of QoS flows corresponding to the second DRB.

The method embodiments of the disclosure have been described above in detail in combination with FIG. 2 to FIG. 3. Hereinafter, the apparatus embodiments of the disclosure will be described in detail in combination with FIG. 4 to FIG. 7. It should be understood that the apparatus embodiments correspond to the method embodiments, and similar descriptions may be referred to the method embodiment.

Figure 4:
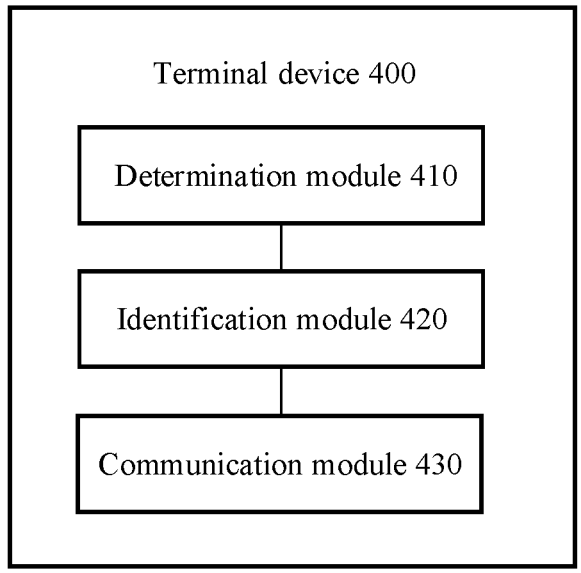
FIG. 4 is a block diagram of a terminal device according to an embodiment of the disclosure.

FIG. 4 is a block diagram of a terminal device according to an embodiment of the disclosure. The terminal device 400 in FIG. 4 includes a determination module 410, an identification module 420 and a communication module 430.

The determination module 410 is configured to determine, according to first mapping relationships, an identification manner for a first QoS flow corresponding to a data packet carried in a first DRB, here, the first mapping relationships are mapping relationships between QoS flows and DRBs.

The identification module 420 is configured to identify, according to the identification manner for the first QoS flow, the first QoS flow corresponding to the data packet carried in the first DRB.

The communication module 430 is configured to send an identified data packet carried in the first DRB to a network device.

Optionally, in some embodiments, in the first mapping relationships, the QoS flows are in one-to-one correspondences with the DRBs or the QoS flows are in multiple-to-one correspondences with the DRBs.

Optionally, in some embodiments, the determination module 410 is further configured to determine the first mapping relationships.

Optionally, in some embodiments, the communication module 430 is further configured to receive high layer signaling sent by the network device, here, the high layer signaling is used by the network device to configure the first mapping relationships to the terminal device.

The determination module 410 is further configured to determine the first mapping relationships according to the high layer signaling.

Optionally, in some embodiments, the communication module 430 is further configured to receive high layer signaling sent by the network device, here, the high layer signaling indicates that the terminal device determines the first mapping relationships according to second mapping relationships, and the second mapping relationships are mapping relationships between DRBs and QoS flows for downlink data mapping.

The determination module 410 is further configured to determine, as the first mapping relationships, the second mapping relationship on which a mirror mapping has been performed.

Optionally, in some embodiments, the determination module 410 is specifically configured to:

when the QoS flows are in one-to-one correspondences with the DRBs in the first mapping relationships, determine that the first QoS flow is identified by adopting a first identification manner, here, the first identification manner is that the first QoS flow corresponding to the data packet in the first DRB is identified by zero-bit identification information; or when the QoS flows are in multiple-to-one correspondences with the DRBs in the first mapping relationships, determine the identification manner for the first QoS flow according to the number of QoS flows corresponding to one DRB.

Optionally, in some embodiments, the determination module 410 is specifically configured to:

when the number of QoS flows corresponding to each DRB is identical in the first mapping relationships, determine the identification manner for the first QoS flow according to the number of QoS flows corresponding to the first DRB; or when the numbers of QoS flows corresponding to at least two DRBs are different from each other in the first mapping relationships, determine the identification manner for the first QoS flow according to the number of QoS flows corresponding to the first DRB; or when the numbers of QoS flows corresponding to at least two DRBs are different from each other in the first mapping relationships, determine the identification manner for the first QoS flow according to the number of QoS flows corresponding to a second DRB, here, the second DRB is a DRB corresponding to the maximum number of QoS flows, in the first mapping relationships.

Optionally, in some embodiments, the determination module 410 is specifically configured to:

determine, when the number of QoS flows corresponding to the first DRB is less than a first preset number threshold, that a second identification manner is adopted to identify the first QoS flow, here, the second identification manner is that identification information having a specific number of bits is determined according to the number of QoS flows corresponding to the first DRB, and the first QoS flow is identified according to the identification information having the specific number of bits; or determine, when the number of QoS flows corresponding to the first DRB is greater than the first preset number threshold, that a third identification manner is adopted to identify the first QoS flow, here, the third identification manner is that the first QoS flow is identified by a QoS flow ID of the first QoS flow.

Optionally, in some embodiments, the determination module 410 is specifically configured to:

determine, when the number of QoS flows corresponding to the second DRB is less than a second preset number threshold, that a fourth identification manner is adopted to identify the first QoS flow, here, the fourth identification manner is that identification information having a specific number of bits is determined according to the number of QoS flows corresponding to the second DRB, and the first QoS flow is identified by the identification information having the specific number of bits; or determine, when the number of QoS flows corresponding to the second DRB is greater than the second preset number threshold, that a fifth identification manner is adopted to identify the first QoS flow, here, the fifth identification manner is that the first QoS flow is identified by a QoS flow ID of the first QoS flow.

Optionally, in some embodiments, the communication module 430 is further configured to receive third mapping relationships sent by the network device, here, the third mapping relationships include correspondences between the identification information having the specific number of bits and the QoS flows under a condition that the second identification manner or the fourth identification manner is adopted.

Optionally, in some embodiments, when at least two DRBs correspond to different numbers of QoS flows in the first mapping relationships, the communication module 430 is further configured to receive indication information from the network device, here, the indication information indicates that the terminal device determines the identification manner for the first QoS flow according to the number of QoS flows corresponding to the first DRB or the number of QoS flows corresponding to the second DRB.

Figure 5:
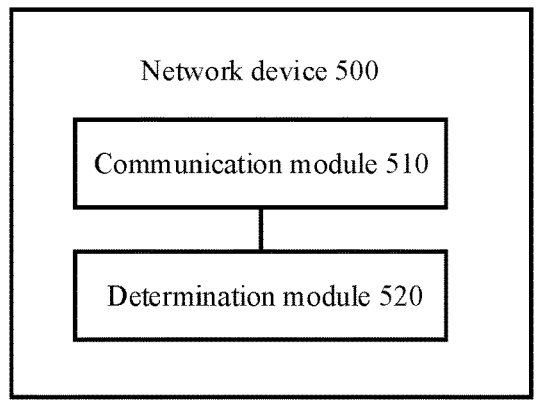
FIG. 5 is a block diagram of a network device according to an embodiment of the disclosure.

FIG. 5 is a block diagram of a network device according to an embodiment of the disclosure. The network device 500 in FIG. 5 includes a communication module 510 and a determination module 520.

The communication module 510 is configured to receive a data packet sent by a terminal device via a first DRB.

The determination module 520 is configured to determine, according to first mapping relationships, an identification manner for a first QoS flow corresponding to the data packet, and determine the first QoS flow corresponding to the data packet in the first DRB according to the identification manner for the first QoS flow, here, the first mapping relationships are mapping relationships between QoS flows and DRBs.

The communication module 510 is further configured to map the data packet carried in the first DRB to the first QoS flow.

Optionally, in some embodiments, in the first mapping relationships, the QoS flows are in one-to-one correspondences with the DRBs or the QoS flows are in multiple-to-one correspondences with the DRBs.

Optionally, in some embodiments, the determination module 520 is further configured to determine the first mapping relationships.

Optionally, in some embodiments, the determination module 520 is further configured to determine, as the first mapping relationships, second mapping relationships on which a mirror mapping has been performed, here, the second mapping relationships are mapping relationships between DRBs and QoS flows mapped for downlink data mapping.

Optionally, in some embodiments, the determination module 520 is specifically configured to:

determine, when the QoS flows are in one-to-one correspondences with the DRBs in the first mapping relationships, that the terminal device identifies the first QoS flow by adopting a first identification manner, here, the first identification manner is that the first QoS flow corresponding to the data packet in the first DRB is identified by zero-bit identification information; and determine, according to the first DRB and the first mapping relationships, a QoS flow corresponding to the first DRB as the first QoS flow.

Optionally, in some embodiments, the determination module 520 is specifically configured to:

when the number of QoS flows corresponding to each DRB is identical in the first mapping relationships, determine the identification manner for the first QoS flow according to the number of QoS flows corresponding to the first DRB; or when the numbers of QoS flows corresponding to at least two DRBs are different from each other in the first mapping relationships, determine the identification manner for the first QoS flow according to the number of QoS flows corresponding to the first DRB; or when the numbers of QoS flows corresponding to at least two DRBs are different from each other in the first mapping relationships, determine the identification manner for the first QoS flow according to the number of QoS flows corresponding to a second DRB, here, the second DRB is a DRB corresponding to the maximum number of QoS flows in the first mapping relationships.

Optionally, in some embodiments, the determination module 520 is specifically configured to:

determine, when the number of QoS flows corresponding to the first DRB is less than a first preset number threshold, that a second identification manner is adopted by the terminal device to identify the first QoS flow, here, the second identification manner is that identification information having a specific number of bits is determined according to the number of QoS flows corresponding to the first DRB, and the first QoS flow is identified by the identification information having the specific number of bits; or determine, when the number of QoS flows corresponding to the first DRB is greater than the first preset number threshold, that a third identification manner is adopted by the terminal device to identify the first QoS flow, here, the third identification manner is that the first QoS flow is identified by a QoS flow ID of the first QoS flow; and determine the first QoS flow according to the identification information having the specific number of bits or the QoS flow ID of the first QoS flow.

Optionally, in some embodiments, the determination module 520 is specifically configured to:

determine, when the number of QoS flows corresponding to the second DRB is smaller than a second preset number threshold, that a fourth identification manner is adopted by the terminal device to identify the first QoS flow, here, the fourth identification manner is that identification information having a specific number of bits is determined according to the number of QoS flows corresponding to the second DRB, and the first QoS flow is identified according to the identification information having the specific number of bits; or determine, when the number of QoS flows corresponding to the first DRB is greater than the first preset number threshold, that a fifth identification manner is adopted by the terminal device to identify the first QoS flow, here, the fifth identification manner is that the first QoS flow is identified by a QoS flow ID of the first QoS flow; and determine the first QoS flow according to the identification information having the specific number of bits or the QoS flow ID of the first QoS flow.

Optionally, in some embodiments, the communication module 510 is further configured to:

send third mapping relationships to the terminal device, here, the third mapping relationships include correspondences between the identification information having the specific number of bits and the QoS flows under a condition that the second identification manner or the fourth identification manner is adopted.

Optionally, in some embodiments, when at least two DRBs correspond to different numbers of QoS flows in the first mapping relationships, the communication module 510 is further configured to:

send indication information to the terminal device, here, the indication information indicates that the terminal device determines the identification manner for the first QoS flow according to the number of QoS flows corresponding to the first DRB or the number of QoS flows corresponding to the second DRB.

Figure 6:
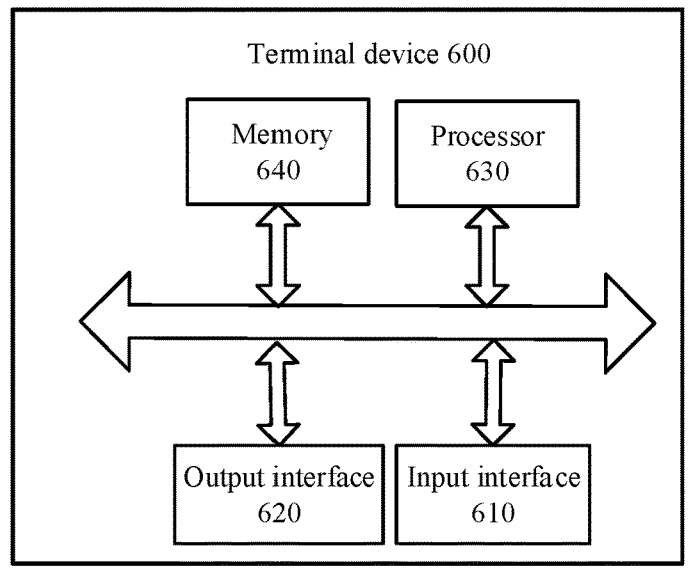
FIG. 6 is a block diagram of a terminal device according to another embodiment of the disclosure.

As illustrated in FIG. 6, the embodiments of the disclosure further provide a terminal device 600. The terminal device 600 may be a terminal device 400 in FIG. 4, and can be configured to execute the contents of the terminal device corresponding to the method 200 in FIG. 2. The terminal device 600 includes: an input interface 610, an output interface 620, a processor 630 and a memory 640. The input interface 610, the output interface 620, the processor 630 and the memory 640 may be connected via a bus system. The memory 640 is configured to store a program, an instruction or a code. The processor 630 is configured to execute the program, the instruction or the code in the memory 640 to control the input interface 610 to receive a signal and control the output interface 620 to send the signal and implement the operations in the foregoing method embodiments.

In the embodiment of the disclosure, the processor 630 may be a Central Processing Unit (abbreviated as "CPU"). The processor 630 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 640 may include a Read Only Memory (ROM) and a Random Access Memory (RAM) and provides instructions and data for the processor 630. A part of the memory 640 may further include a nonvolatile RAM. For example, the memory 640 may further store information on a type of a device.

During an implementation process, the operations of the methods may be implemented by an integrated logic circuit of hardware in the processor 630 or an instruction in a software form. Operations of the methods disclosed in combination with the embodiments of the disclosure may be directly executed and implemented by means of a hardware processor or may be executed and implemented by means of a combination of hardware and software modules in the processor. The software module may be located in a mature storage medium in the art, such as a RAM, a flash memory, an ROM, a Programmable ROM (PROM), an Electrically EPROM (EEPROM) or a register. The storage medium is located in the memory 640. The processor 630 reads information from the memory 640 and implements the operations of the foregoing methods in combination with the hardware of the processor. In order to avoid repetition, the above will not be described herein in detail.

In a specific implementation manner, the determination module 410 included in the terminal device in FIG. 4 may be implemented by the processor 630 in FIG. 6, and the communication module 430 included in the terminal device 400 may be implemented by the input interface 610 and the output interface 620 in FIG. 6.

Figure 7:
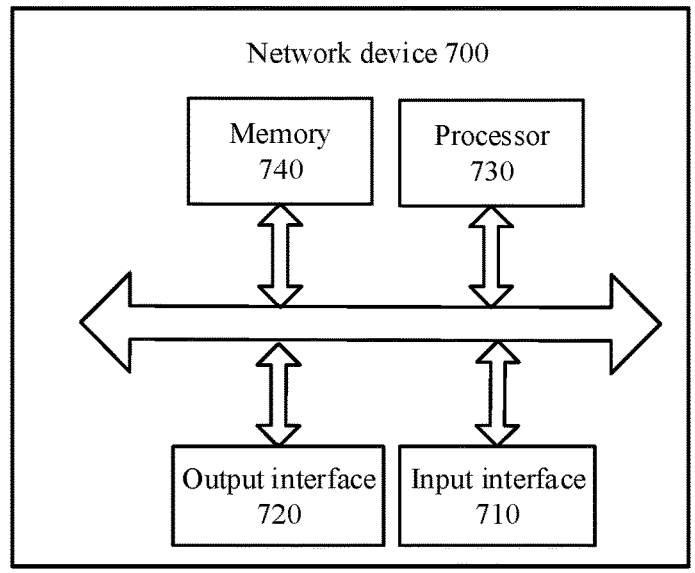
FIG. 7 is a block diagram of a network device according to another embodiment of the disclosure.

As illustrated in FIG. 7, the embodiments of the disclosure further provide a network device 700. The network device 700 may be a network device 500 in FIG. 5, and can be configured to execute the contents of the network device corresponding to the method 300 in FIG. 3. The network device 700 includes: an input interface 710, an output interface 720, a processor 730 and a memory 740. The input interface 710, the output interface 720, the processor 730 and the memory 740 may be connected via a bus system.

The memory 740 is configured to store a program, an instruction or a code. The processor 730 is configured to execute the program, the instruction or the code in the memory 740 to control the input interface 710 to receive a signal and control the output interface 720 to send the signal and implement the operations in the foregoing method embodiments.

In the embodiment of the disclosure, the processor 730 may be a Central Processing Unit (abbreviated as "CPU"). The processor 730 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 740 may include a Read Only Memory (ROM) and a Random Access Memory (RAM) and provides instructions and data for the processor 730. A part of the memory 740 may further include a nonvolatile RAM. For example, the memory 740 may further store information on a type of a device.

During an implementation process, the operations of the methods may be implemented by an integrated logic circuit of hardware in the processor 730 or an instruction in a software form. Operations of the methods disclosed in combination with the embodiments of the disclosure may be directly executed and implemented by means of a hardware processor or may be executed and implemented by means of a combination of hardware and software modules in the processor. The software module may be located in a mature storage medium in the art, such as a RAM, a flash memory, an ROM, a Programmable ROM (PROM), an Electrically EPROM (EEPROM) or a register. The storage medium is located in the memory 740. The processor 730 reads information from the memory 740 and implements the operations of the foregoing methods in combination with the hardware of the processor. In order to avoid repetition, the above will not be described herein in detail.

In a specific implementation manner, the determination module 520 included in the network device in FIG. 5 may be implemented by the processor 730 in FIG. 7, and the communication module 510 included in the network device 500 may be implemented by the input interface 710 and the output interface 720 in FIG. 7.

A person of ordinary skill in the art may be aware that in combination with the examples described in the embodiments disclosed in the disclosure, units and algorithm operations may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the disclosure, the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be the indirect couplings or communication connections, implemented through some interfaces, of the devices or units, and may be in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When being implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions configured to enable a computer device (which may be a personal computer, a server, or a network device) to perform all or some of the operations of the methods described in the embodiments of the disclosure. The foregoing storage medium includes any medium that can store program code, such as a U disk, a removable hard disk, an ROM, an RAM, a magnetic disk, or an optical disc.

The foregoing descriptions are merely specific implementation manners of the disclosure but are not intended to limit the scope of protection of the disclosure. Any variation or replacement apparent to a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for uplink transmission, comprising:
    determining, by a terminal device, according to first mapping relationships, an identification manner for a first Quality of Service (QoS) flow corresponding to a data packet carried in a first Data Radio Bearer (DRB), the first mapping relationships being mapping relationships between QoS flows and DRBs;
    wherein determining, by the terminal device, according to the first mapping relationships, the identification manner for the first QoS flow corresponding to the data packet carried in the first DRB comprises:
    when the QoS flows are in multiple-to-one correspondences with the DRBs in the first mapping relationships, determining, by the terminal device, the identification manner for the first QoS flow according to a number of QoS flows corresponding to one DRB;
    wherein determining, by the terminal device, the identification manner for the first QoS flow according to the number of QoS flows corresponding to one DRB comprises:
    when the number of QoS flows corresponding to each DRB is identical in the first mapping relationships and the number of QoS flows corresponding to the first DRB is less than a first preset number threshold, determining that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the number of QoS flows corresponding to each DRB is identical in the first mapping relationships and the number of QoS flows corresponding to the first DRB is greater than the first preset number threshold, determining that a third identification manner is adopted to identify the first QoS flow, the third identification manner being that the first QoS flow is identified by a QoS flow Identity (ID) of the first QoS flow; or when the numbers of QoS flows corresponding to at least two DRBs are different from each other in the first mapping relationships and the number of QoS flows corresponding to the first DRB is less than a first preset number threshold, determining that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the numbers of QoS flows corresponding to at least two DRBs are different from each other in the first mapping relationships and the number of QoS flows corresponding to the first DRB is greater than the first preset number threshold, determining that a third identification manner is adopted to identify the first QoS flow, the third identification manner being that the first QoS flow is identified by a QoS flow Identity (ID) of the first QoS flow;

identifying, by the terminal device, according to the identification manner for the first QoS flow, the first QoS flow corresponding to the data packet carried in the first DRB; and sending, by the terminal device, an identified data packet to a network device via the first DRB.

2. The method of claim 1, further comprising:
determining, by the terminal device, the first mapping relationships.

3. The method of claim 2, wherein determining, by the terminal device, the first mapping relationships comprises:
receiving, by the terminal device, high layer signaling sent by the network device, the high layer signaling being used by the network device to configure the first mapping relationships to the terminal device; and
determining, by the terminal device, the first mapping relationships according to the high layer signaling.

4. The method of claim 2, wherein determining, by the terminal device, the first mapping relationships comprises:
receiving, by the terminal device, high layer signaling sent by the network device, the high layer signaling indicating that the terminal device determines the first mapping relationships according to second mapping relationships, and the second mapping relationships being mapping relationships between DRBs and QoS flows for downlink data mapping; and determining, by the terminal device, as the first mapping relationships, the second mapping relationships on which a mirror mapping has been performed.

5. A method for uplink transmission, comprising:
receiving, by a network device, a data packet sent by a terminal device via a first Data Radio Bearer (DRB);
determining, by the network device, according to first mapping relationships, an identification manner for a first Quality of Service (QoS) flow corresponding to the data packet, the first mapping relationships being mapping relationships between QoS flows and DRBs;
wherein determining, by the network device, according to the first mapping relationships, the identification manner for the first QoS flow corresponding to the data packet carried in the first DRB comprises:
when the QoS flows are in multiple-to-one correspondences with the DRBs in the first mapping relationships, determining, by the network device, the identification manner for the first QoS flow according to a number of QoS flows corresponding to one DRB;
wherein determining, by the network device, the identification manner for the first QoS flow according to the number of QoS flows corresponding to one DRB comprises;
when the number of QoS flows corresponding to each DRB is identical in the first mapping relationships and the number of QoS flows corresponding to the first DRB is less than a first preset number threshold, determining that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the number of QoS flows corresponding to each DRB is identical in the first mapping relationships and the number of QoS flows corresponding to the first DRB is greater than the first preset number threshold, determining that a third identification manner is adopted to identify the first QoS flow, the third identification manner being that the first QoS flow is identified by a QoS flow Identity (ID) of the first QoS flow; or when the numbers of QoS flows corresponding to at least two DRBs are different from each other in the first mapping relationships and the number of QoS flows corresponding to the first DRB is less than a first preset number threshold, determining that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the numbers of QoS flows corresponding to at least two DRBs are different from each other in the first mapping relationships and the number of QoS flows corresponding to the first DRB is greater than the first preset number threshold, determining that a third identification manner is adopted to identify the first QoS flow, the third identification manner being that the first QoS flow is identified by a QoS flow Identity (ID) of the first QoS flow;

determining, by the network device, the first QoS flow corresponding to the data packet carried in the first DRB, according to the identification manner for the first QoS flow; and mapping, by the network device, the data packet carried in the first DRB to the first QoS flow.

6. The method of claim 5, further comprising:
determining, by the network device, the first mapping relationships.

7. The method of claim 6, wherein determining, by the network device, the first mapping relationships comprises:
determining, by the network device, as the first mapping relationships, second mapping relationships on which a mirror mapping has been performed, the second mapping relationships being mapping relationships between DRBs and QoS flows for downlink data mapping.

8. A terminal device, comprising:
a processor, configured to:
determine, according to first mapping relationships, an identification manner for a first Quality of Service (QoS) flow corresponding to a data packet carried in a first Data Radio Bearer (DRB), the first mapping relationships being mapping relationships between QoS flows and DRBs; and
identify, according to the identification manner for the first QoS flow, the first QoS flow corresponding to the data packet carried in the first DRB; and
an output interface, configured to send an identified data packet to a network device via the first DRB,
wherein, the processor is further configured to:
when the QoS flows are in multiple-to-one correspondences with the DRBs in the first mapping relationships, determine the identification manner for the first QoS flow according to a number of QoS flows corresponding to one DRB;
wherein, the processor is further configured to:
when the number of QoS flows corresponding to each DRB is identical in the first mapping relationships and the number of QoS flows corresponding to the first DRB is less than a first preset number threshold, determine that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the number of QoS flows corresponding to each DRB is identical in the first mapping relationships and the number of QoS flows corresponding to the first DRB is greater than the first preset number threshold, determine that a third identification manner is adopted to identify the first QoS flow, the third identification manner being that the first QoS flow is identified by a QoS flow Identity (ID) of the first QoS flow; or
when the numbers of QoS flows corresponding to at least two DRBs are different from each other in the first mapping relationships and the number of QoS flows corresponding to the first DRB is less than a first preset number threshold, determine that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the numbers of QoS flows corresponding to at least two DRBs are different from each other in the first mapping relationships and the number of QoS flows corresponding to the first DRB is greater than the first preset number threshold, determine that a third identification manner is adopted to identify the first QoS flow, the third identification manner being that the first QoS flow is identified by a QoS flow Identity (ID) of the first QoS flow.

9. The terminal device of claim 8, wherein the processor is further configured to determine the first mapping relationships.

10. The terminal device of claim 9, further comprising an input interface, wherein
the input interface is configured to:
receive high layer signaling sent by the network device, the high layer signaling being used by the network device to configure the first mapping relationships to the terminal device; and
the processor is configured to:
determine the first mapping relationships according to the high layer signaling.

11. The terminal device of claim 9, further comprising an input interface, wherein the input interface is configured to:
receive high layer signaling sent by the network device, the high layer signaling indicating that the terminal device determines the first mapping relationships according to second mapping relationships, and the second mapping relationships being mapping relationships between DRBs and QoS flows for downlink data mapping; and
the processor is configured to:
determine, as the first mapping relationships, the second mapping relationships on which a mirror mapping has been performed.

12. The terminal device of claim 8, further comprising an input interface, wherein
the input interface is configured to:
receive third mapping relationships sent by the network device, the third mapping relationships comprising correspondences between the identification information having the specific number of bits and the QoS flows under a condition that the second identification manner is adopted.

13. The terminal device of claim 8, further comprising an input interface, wherein
when at least two DRBs correspond to different numbers of QoS flows in the first mapping relationships, the input interface is configured to:
receive indication information from the network device, the indication information indicating that the terminal device determines the identification manner for the first QoS flow according to the number of QoS flows corresponding to the first DRB.

14. A network device, comprising:
an input interface, configured to receive a data packet sent by a terminal device via a first Data Radio Bearer (DRB); and
a processor, configured to:
determine, according to first mapping relationships, an identification manner for a first Quality of Service (QoS) flow corresponding to the data packet, and
determine the first QoS flow corresponding to the data packet carried in the first DRB according to the identification manner for the first QoS flow, the first mapping relationships being mapping relationships between QoS flows and DRBs; and map the data packet carried in the first DRB to the first QoS flow;

wherein the processor is further configured to:

when the QoS flows are in multiple-to-one correspondences with the DRBs in the first mapping relationships, determine the identification manner for the first QoS flow according to a number of QoS flows corresponding to one DRB;

wherein the processor is further configured to:

when the number of QoS flows corresponding to each DRB is identical in the first mapping relationships and the number of QoS flows corresponding to the first DRB is less than a first preset number threshold, determine that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the number of QoS flows corresponding to each DRB is identical in the first mapping relationships and the number of QoS flows corresponding to the first DRB is greater than the first preset number threshold, determine that a third identification manner is adopted to identify the first QoS flow, the third identification manner being that the first QoS flow is identified by a QoS flow Identity (ID) of the first QoS flow; or when the numbers of QoS flows corresponding to at least two DRBs are different from each other in the first mapping relationships and the number of QoS flows corresponding to the first DRB is less than a first preset number threshold, determine that a second identification manner is adopted to identify the first QoS flow, the second identification manner being that identification information having a specific number of bits is determined according to the number of QoS flows corresponding to the first DRB, and the first QoS flow is identified by the identification information having the specific number of bits; when the numbers of QoS flows corresponding to at least two DRBs are different from each other in the first mapping relationships and the number of QoS flows corresponding to the first DRB is greater than the first preset number threshold, determine that a third identification manner is adopted to identify the first QoS flow, the third identification manner being that the first QoS flow is identified by a QoS flow Identity (ID) of the first QoS flow.

15. The network device of claim 14, wherein the processor is further configured to determine the first mapping relationships.

16. The network device of claim 15, wherein the processor is further configured to:

determine, as the first mapping relationships, second mapping relationships on which a mirror mapping has been performed, the second mapping relationships being mapping relationships between DRBs and QoS flows for downlink data mapping.

* * * * *